United States Patent Office 2,831,028
Patented Apr. 15, 1958

2,831,028

PREPARATION OF UNSATURATED 3-KETO COMPOUNDS OF THE p-MENTHANE SERIES

Joseph P. Bain and Wilbur Y. Gary, Jacksonville, Fla., assignors to The Glidden Company, Cleveland, Ohio, a corporation of Ohio No Drawing. Original application September 28, 1953, Serial No. 382,839. Divided and this application December 17, 1956, Serial No. 628,538

5 Claims. (Cl. 260—587)

The present invention is concerned with the preparation of certain terpene ketones which are capable of being hydrogenated to a menthol and menthone.

In copending application Serial No. 377,000, filed August 27, 1953, it was shown that by autoxidation of limonene and decomposition of the peroxide so formed by treatment with sodium sulfite under alkaline conditions, there could be obtained a good yield of 2,8-p-menthadiene-1-ol. Similarly, it was shown in said application that 2-p-menthene-1-ol could be produced by the same treatment of carbomenthene.

Since these alcohols can be readily obtained by following the teachings of the above-mentioned copending application and since they are thus made readily available, it would be desirable to be able to convert them into ketones having the keto at the 3-positions, since these could then be hydrogenated to menthols and menthones.

Accordingly, it is an object of the present invention to provide a process for converting the above tertiary alcohols into 3-keto compounds of the p-menthane series.

Another object is to provide a process for converting certain terpene alcohols not capable of being hydrogenated to a menthol into forms that are capable of being hydrogenated to a menthol.

An additional object is to provide a new process for the production of piperitone.

A further object is to provide a new process for the production of isopiperitenone.

Still another object is to produce compounds of the p-menthane series having an oxygenated substituent in the 3-position from 1-hydroxy-$\Delta^2$-compounds of the p-menthane series.

Other objects will be apparent to those skilled in the art.

Although the above-mentioned tertiary alcohols cannot be hydrogenated to menthol, since they have the hydroxyl group in the 1-position, and menthol is a secondary alcohol having its hydroxyl group in the 3-position, we have found that if any of the above tertiary alcohols be oxidized with chromic acid, there is produced the 3-keto compound. The 3-keto compound is suitable for hydrogenation to menthol or menthone. The reactions can be illustrated as follows:

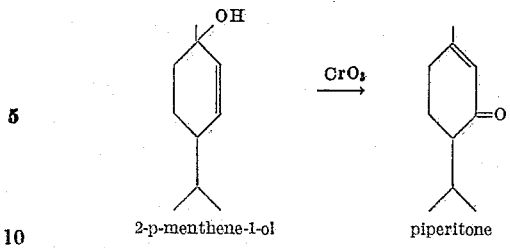

2,8-p-menthadiene-1-ol → 1,8-p-menthadiene-3-one (isopiperitenone)

2-p-menthene-1-ol → piperitone

Each of the alcohols shown is capable of existence in both cis- and trans-forms. Either form can be used. If the particular tertiary alcohol used is optically active, optically active ketone is produced, although in the case of oxidation of the menthadienol, some of the optical activity may be lost due to the ready isomerization of the isopiperitenone to piperitenone. Thus, by hydrogenation of the double bonds of the ketone formed from an optically active tertiary alcohol and choice of the proper menthone resulting therefrom in accordance with known principles, either of the optically active menthones or menthols can be obtained.

The following examples are illustrative of the invention:

Example 1

375 grams of β-2,8-menthadiene-1-ol of about 82% purity was treated with 367 grams of sodium dichromate in 1468 grams water. To this mixture was added 1015 grams of 50% sulfuric acid with agitation and dropwise over a period of 2 hours. Cooling was employed to maintain the temperature below 36° C. 500 ml. of heptane was added, and the phases separated. After washing the oil phase twice with 100 cc. portions of water, once with 100 ml. saturated sodium carbonate and twice more with water, the oil was dried with anhydrous sodium sulfate. From a small sample the heptane was removed under vacuo and the heptane-free residue was analyzed by infrared methods to show it consisted of 30% alcohols, remainder largely isopiperitenone. No piperitenone was present in this sample. The bulk of the heptane solution was stripped of solvent at atmospheric pressure and the residue was fractionated at 10 mm. Initial fractions consisted of the alcohol and intermediate fractions were almost pure isopiperitenone, B. P. 109–110° C., $\alpha_D^{25}$ +68.3° (10 cm. tube). Higher boiling fractions became progressively richer in the optically inactive piperitenone, B. P. about 114° C., for the fraction richest in this compound, thus demonstrating the easy conversion of isopiperitenone to piperitenone by heat.

Example 2

α-2-p-menthene-1-ol, B. P. 85° C. (at 10 mm.), $n_D^{25}$ 1.4698, $d_4^{25}$ 0.915, F. P. 6–8° C., $[\alpha]_D^{25}$ −17.2°, was oxidized according to the method of Organic Synthesis, Collective Vol. I, 2d ed., p. 340, for the oxidation of menthol to menthone. The oxidation mixture contained over 60% piperitone as shown by infrared absorption analysis, and on fractionation the best fraction consisted of approximately 85% piperitone and had an optical rotation of approximately +42° (10 cm. tube). A similar oxidation of β-2-p-menthene-1-ol, B. P. 91° C., $n_D^{25}$ 1.4729, $d_4^{25}$ 0.915, $[\alpha]_D^{25}$ +69.2°, also gave dextro rotatory piperitone.

Example 3

An air oxidation mixture of α-terpineol having a peroxide number of 1405 was heated with an aqueous alkaline sodium sulfite solution in one hour from 25 to 80° C.

and the reaction continued at 80–85° C. for 3 hours. The oil layer was recovered and fractionated. Fractions boiling at about 98° C. at 1 mm. were composed mostly of trans-2-menthene-1,8-diol; the purest fraction showed $n_D^{25}$ 1.4970. Beckmann oxidation of such a material yielded a ketol which infrared analysis revealed was 8-hydroxy-piperitone. Fractions recovered from the reduced α-terpineol oxidation mixture boiling at about 113–122° C. at 2.5 mm. contained the cis-form of 2-menthene-1,8-diol, and Beckmann oxidation thereof yielded the same 8-hydroxy-piperitone as obtained on oxidation of the trans-form.

It is thus seen that in general these $\Delta^2$-1-hydroxy-p-menthenes are oxidized to the $\Delta^1$-3-keto compounds by chromic acid oxidation. This is so, even though there are other substituents on the molecule.

In the foregoing description, all temperatures are in degrees centigrade.

The preparation of the 2,8-p-menthadiene-1-ols, the 2-p-menthene-1-ols and of the 2-menthene-1,8-diols by the method herein described is claimed in the copending application of Bain, Klein and Gary, Serial No. 377,000, filed August 27, 1953.

This application is a division of our application Serial No. 382,839, filed September 28, 1953.

Having described the invention, what is claimed is:

1. The process for producing 3-keto compounds of the p-menthane series having a double bond in the 1–2 position which comprises subjecting a compound of the p-menthane series having a hydroxyl group at the 1-position and a single non-conjugated ring double bond in the 2–3 position to a chromic acid oxidation.

2. The process of claim 1 in which the starting material is 2,8-p-menthadiene-1-ol.

3. The process of claim 1 in which the starting material is 2-p-menthene-1-ol.

4. The process of claim 1 in which the starting material is 2-p-menthene-1,8-diol.

5. The process of claim 1 in which the starting material is optically active.

No references cited.